United States Patent
Oh et al.

(10) Patent No.: US 8,327,306 B2
(45) Date of Patent: Dec. 4, 2012

(54) METHOD FOR OPTIMIZING LOCATION AND NUMBER OF POWER/GROUND PADS ON POWER/GROUND DISTRIBUTION NETWORK WITH MULTIPLE VOLTAGE DOMAINS

(75) Inventors: Sung Hwan Oh, Seoul (KR); Dong Jin Shin, Seongnam-si (KR)

(73) Assignee: Entasys Designs, Inc., Seoul (KR)

( * ) Notice: Subject to any disclaimer, the term of this patent is extended or adjusted under 35 U.S.C. 154(b) by 110 days.

(21) Appl. No.: 12/911,789

(22) Filed: Oct. 26, 2010

(65) Prior Publication Data

US 2011/0107283 A1    May 5, 2011

(30) Foreign Application Priority Data

Oct. 30, 2009    (KR) .................. 10-2009-0103976

(51) Int. Cl.
*G06F 17/50* (2006.01)
(52) U.S. Cl. ......... 716/133; 716/119; 716/120; 716/122
(58) Field of Classification Search .................. 716/106, 716/109, 118, 119, 120, 133, 122
See application file for complete search history.

(56) References Cited

U.S. PATENT DOCUMENTS

| | | | | |
|---|---|---|---|---|
| 4,811,237 A * | 3/1989 | Putatunda et al. | ............. | 716/127 |
| 7,135,759 B2 * | 11/2006 | Efland et al. | ................. | 257/676 |
| 7,245,507 B2 * | 7/2007 | DiBene et al. | ................ | 361/803 |
| 7,271,489 B2 * | 9/2007 | Lin et al. | ........................ | 257/773 |
| 7,571,404 B2 * | 8/2009 | Zhao et al. | .................... | 716/106 |
| 7,698,677 B2 * | 4/2010 | Zhao et al. | .................... | 716/122 |
| 7,844,438 B1 * | 11/2010 | Verghese et al. | ................ | 703/14 |
| 8,021,927 B2 * | 9/2011 | Khan et al. | .................... | 438/122 |
| 8,110,926 B2 * | 2/2012 | Grygiel | ......................... | 257/773 |
| 8,247,906 B2 * | 8/2012 | Law et al. | ..................... | 257/774 |
| 2008/0098340 A1 * | 4/2008 | Oh | ................................. | 716/8 |

OTHER PUBLICATIONS

Sato, et al Successive pad assignment algorithm to optimizer number and location power supply pad using incremental matrix inversion, (2005), IEEE.
Zhao, et al. Optimal Placement of Power Supply Pads and Pins, DAC (2004).

\* cited by examiner

*Primary Examiner* — Sun Lin
(74) *Attorney, Agent, or Firm* — Fulbright & Jaworski LLP (57) ABSTRACT

The present invention relates to a method for optimizing power/ground pads in a power/ground distribution network. A power/ground distribution network is created for each of multiple voltage domains and a load current source of each node of the power/ground distribution network is modeled in consideration of the actual shapes and areas of functional blocks. A local optimization method is developed to solve problems generated when a conventional optimization method is applied to optimization of power/ground pads in a bump shape used for a flip chip, and a combination of global optimization and local optimization is applied to layouts using bump bonding, which is discriminated from the conventional optimization method restrictively applicable to layouts using wire bonding.

11 Claims, 9 Drawing Sheets

METHOD FOR OPTIMIZING LOCATION AND NUMBER OF POWER/GROUND PADS ON POWER/GROUND DISTRIBUTION NETWORK WITH MULTIPLE VOLTAGE DOMAINS

RELATED APPLICATIONS

This application claims priority from Korean Patent Application No. 10-2009-103976 filed Oct. 30, 2009, which is incorporated herein by reference in its entirety.

BACKGROUND OF THE INVENTION

1. Field of the Invention

The present invention relates to a method for optimizing the location and number of power/ground pads on a power/ground distribution network with multiple voltage domains. More specifically, the invention relates to a method for decreasing an optimization time and securing the minimum number and location of pads in a power distribution network layout by solving problems generated when a conventional pad optimization method is applied to a power/ground distribution network layout using bump bonding and supplementing shortcomings of the conventional pad optimization method.

2. Background of the Related Art

It is very important to provide power to functional blocks constituting an integrated circuit while decreasing IR drop generated in a power/ground distribution network of the integrated circuit below a reference value. This can be achieved by determining the optimized location and number of power/ground pads that provide power such that the worst IR drop in the power/ground distribution network becomes lower than the reference value. In the following description, a pad selected to be used as a power/ground pad is referred to as 'optimized pad', an optimization method for analyzing the power/ground distribution network for global pads to find optimized pads is referred to as 'global optimization method' and a pad optimization method provided by the present invention is referred to as 'local optimization method'.

<Power/ground distribution network layout and IR drop analysis method>

A power/ground distribution network is designed on the assumption that the power/ground distribution network has a single voltage domain and optimization is performed using only static IR drop in an integrated circuit, and thus the power/ground distribution network is modeled as a linear resistor network having an independent current source.

The following modified nodal analysis (MNA) is used for static analysis of the power/ground distribution network structure.

[Equation 1]

$$G \cdot X = I$$

Here, G represents conductance matrix, X represent the vector of a node voltage, and I denotes an independent current source.

The independent current source I is composed of a Thevenin equivalent current source modified from a voltage source and a load current source that represents power consumption of a functional block.

Once the equation 1 for the power/ground distribution network structure analysis is constructed, the solution (node voltage) of the power/ground distribution network structure can be obtained through a direct method or an iterative method [Reference: T Sato, M. Hashimoto and H. Onodera, "Successive pad assignment algorithm to optimize number and location of power supply pad using incremental matrix inversion", Asia and South Pacific Design Automation conference, pp. 723-728, 2005].

<Load current source modeling method for analysis of power/ground distribution network>

The load current source, an element of the vector of the current source in the equation 1, represents power consumption of a functional block in the power/ground distribution network and is calculated based on the size and power consumption of the functional block. Accordingly, the worst IR drop is generated at a node to which the load current source belongs, and thus the node having the load current source is used as an IR drop observation node.

In a prior art, the arrangement of load current sources is simplified by equally spacing the load current sources in the functional block or placing them at the center of the functional block.

<Global optimization method>

The global optimization method globally reduces the worst IR drop in the power/ground distribution network according to the following method and finds pads one by one based on greedy search.

Figure 1:
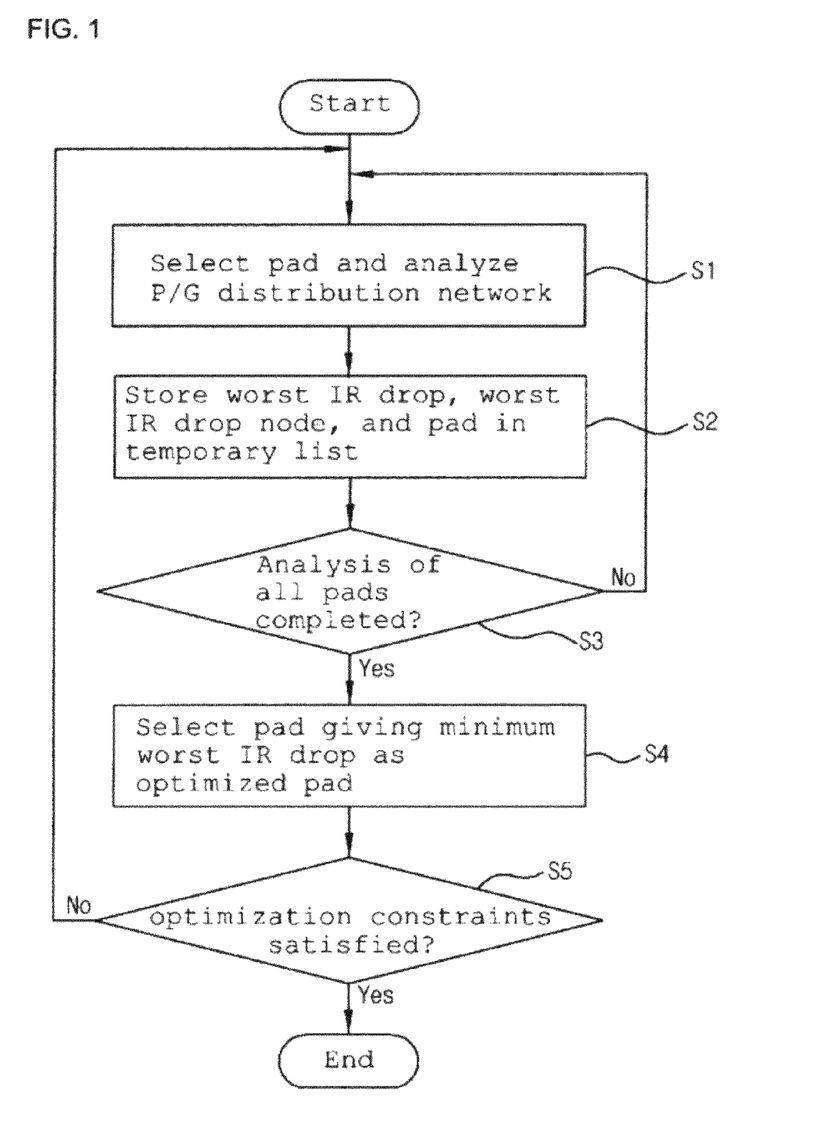
FIG. 1 is a flowchart of a conventional global optimization method for optimizing power/ground pads of an integrated circuit.

FIG. 1 is a flowchart of a conventional global optimization method for optimizing power/ground pads of an integrated circuit.

Referring to FIG. 1, one of given pad candidates is selected and a power/ground distribution network is analyzed in step S1.

An observation node having the worst IR drop is found from observation nodes of the power/ground distribution network, the worst IR drop is calculated, and the pad candidate and worst IR drop value are stored in a temporary memory in step S2.

A pad candidate which is not selected from the given pad candidates is selected and the steps 1 and 2 are repeated in step S3.

After all the pad candidates are used, a pad candidate giving a minimum worst IR drop is determined as a pad and stored in a pad list in step S4.

The optimization process is returned to the step 1 when the worst IR drop calculated with the determined pad does not satisfy constraints and the optimization process is ended when the worst IR drop satisfies the constraints in step S5. Here, the pad candidate determined as a pad among the pad candidates is excluded.

The above-described optimization method analyzes the power/ground distribution network using all the given pad candidates to find a single optimized pad, and thus the optimization time is affected by the number of the given pad candidates. Accordingly, the aforementioned optimization method is not suitable for recent integrated circuit layouts using bump bonding which requires a large number of pads since a long time is taken for the optimization.

<Setting of optimization constraints>

To verify the validity of optimized pads, it is checked whether IR drops of observation nodes and current flowing through pads in the power/ground distribution network satisfy the constraints after optimization to finally determine whether the pads are optimized. That is, a voltage is applied to pads selected as optimized pads and whether the worst IR drop in the power/ground distribution network is lower than a reference value and whether the currents flowing through the pads selected as the optimized pads are smaller than a reference value are checked. When the worst IR drop at the node is lower than the reference value and the current of the pad is smaller than the reference value, it is determined that the optimization is completed.

A technique of providing optimized location and number of power/ground pads that provide power such that the worst IR drop in a power/ground distribution network becomes below an allowable reference value is required. However, when the conventional global optimization method is applied to the recent integrated circuit layouts using bump bonding, the global optimization method, the use of a single voltage domain, and optimization constraints that determine optimization only using a target IR drop and maximum current flowing through pads may increase the optimization time or take an unnecessary time for optimization and bring about inappropriate pad arrangement.

SUMMARY OF THE INVENTION

Accordingly, the present invention has been made in view of the above-mentioned problems occurring in the prior art, and it is a primary object of the present invention to provide a method for optimizing the location and number of power/ground pads on a power/ground distribution network with multiple voltage domains to decrease a time required for optimization.

It is another object of the present invention to provide a method for optimizing power/ground pads of an integrated circuit designed using bump bonding through a combination of global optimization and local optimization.

It is still another object of the present invention to provide a method for automatically creating a power/ground distribution network in consideration of multiple voltage domains when power/ground pads of an integrated circuit designed using wire bonding are optimized.

It is yet another object of the present invention to provide a local optimization method for allocating power pads nearest to a node having the worst IR drop in an integrated circuit power/ground distribution layout and providing power through the power pads to reduce IR drop.

It is a different object of the present invention to provide a method of recognizing a functional block of rectilinear polygon when a load current source of a power/ground distribution network is calculated.

It is another different object of the present invention to provide a method of estimating an optimization result through a graph showing sensitivity for the number of pads giving worst IR drops in a power/ground distribution network after optimization of power/ground pads.

It is still another different object of the present invention to provide a method of adding an optimization convergence condition to optimization constraints to determine whether to perform optimization.

The present invention develops a local optimization method to solve the problem generated when the conventional global optimization method is applied to integrated circuit layouts using bump bonding and applies a combination of global optimization and local optimization to the integrated circuit layouts using bump bonding based on the local optimization method to discriminate the bump bonding method from the wire bonding method.

The basic concept of the local optimization selects a pad candidate nearest to a node having the worst IR drop based on the free pad arrangement of the bump bonding method to reduce the worst IR drop. That is, although the global optimization selects an optimized pad using all of given pad candidates, the local optimization uses only pad candidates close to the node having the worst IR drop so as to reduce the optimization time. In addition, the local optimization allocates pads in proximity to a point where IR drop is actually generated, and thus accuracy is improved to reach a target worst IR drop using a small number of pads.

To accomplish the above objects of the present invention, according to the present invention, there is provided a method for optimizing the location and number of power/ground pads on a power/ground distribution network with multiple voltage domains, the method comprising a power/ground distribution network designing step of designing the power/ground distribution network for each of the multiple voltage domains; a load current source modeling step of modeling a load current source for each node of the power/ground distribution network; a global optimization step of checking if a pad bonding method of a chip is a bump bonding method, analyzing the power/ground distribution network for each pad to find nodes having the worst IR drop when the pad bonding method corresponds to the bump bonding method, and selecting a pad corresponding to a node having a minimum worst IR drop among the nodes having the worst IR drop as a first optimized pad; a local optimization step of analyzing the power/ground distribution network according to optimized pads selected so far to select a node having the worst IR drop, searching for pads close to the node having the worst IR drop and selecting a pad having a minimum worst IR drop as an optimized pad; and an optimization constraints determination step of repeating the local optimization step until optimization constraints are satisfied and storing information about corresponding optimized pads when the optimization constraints are satisfied.

After the global optimization step, the local optimization step is performed after a pad nearest to the node having the worst IR drop for the first optimized pad is selected as a second optimized pad.

The optimization method according to the present invention further comprises an optimized pad estimation step of creating a graph showing the worst IR drop of the power/ground distribution network according to the location and number of optimized pads and a variation in the number of pads, providing the graph to a screen when the optimization constraints are satisfied in the optimization constraints determination step, when a user selects a pad with low sensitivity through the graph, excluding the selected pad from the optimized pads to correct optimized pads and automatically allocating finally determined optimized pads.

The optimized pad estimation step comprises a first step of creating a graph showing the worst IR drop of the power/ground distribution network according to a variation in the number of selected optimized pads when the optimization constraints are satisfied; a second step of displaying the created graph and information on the location and number of optimized pads in the power/ground distribution network on a screen; a third step of estimating a pad with low sensitivity by a user based on the information provided in the second step and setting current optimized pads as final optimized pads or, when at least one pad is selected to be additionally excluded, deleting an optimized pad corresponding to the selected at least one pad; and a fourth step of storing the location and number of the optimized pads determined in the third step and ending the optimization.

The optimization method according to the present invention further comprises a global optimization step of analyzing the power/ground distribution network for each pad and selecting a pad having a minimum worst IR drop as an optimized pad and an optimization constraints determination step of repeating the step S60 until optimization constraints are satisfied to select optimized pads when the pad bonding method corresponds to a wire bonding method.

The power/ground distribution network designing step comprises the steps of analyzing multiple voltage domains in the layout of a chip with the multiple voltage domains and automatically creating the power/ground distribution network according to the size and structure of a designated voltage domain; and selecting functional blocks and pad candidates belonging to the designated voltage domain.

The load current source modeling step comprises the step of setting nodes of the power/ground distribution network as observation nodes, virtually segmenting the area corresponding to the observation nodes such that neighboring observation nodes are not overlapped and regions of the nodes have the same area, and calculating the areas of functional blocks belonging to the region of a corresponding node; and calculating a load current source based on the sum of the calculated areas of the functional blocks and setting the calculated load current source as a load current source of the corresponding node.

The local optimization step comprises a first step of analyzing the power/ground distribution network according to optimized pads selected so far and finding a node having the worst IR drop; a second step of checking if a pad exist at the node having the worst ID drop and selecting the pad as an optimized pad when the pad exists at the node having the worst IR drop; a third step of setting an area that connects nodes spaced part from the node having the worst IR drop, found in the first step, by a single segment (a distance between nodes adjacent to each other) as a search area and searching for pad candidates while sequentially increasing the level of the search area until a pad candidate is found in the search area or the level of the search region reaches a predetermined search level when any pad is not found in the second step; a fourth step of determining a pad candidate as an optimized pad when the pad candidate is found in the search area; a fifth step of analyzing the power/ground distribution network using two or more pad candidates when the two or more pad candidates are found in the search area in the third S43 and determining a pad candidate having a minimum worst IR drop as an optimized pad; and a sixth step of determining a pad nearest to the node having the worst IR drop, found in the first step, as an optimized pad when any pad is not found even when pad candidates are searched until the level of the search region reaches the predetermined search level in the third step.

The optimization constraints determination step comprises a step of determining that the optimization constrains are satisfied when IR drops of nodes of the power/ground distribution network for optimized pads selected so far and current flowing through pads are within an allowable range set on the layout and ending the local optimization; and an optimization convergence step of calculating a relative error of a current worst IR drop and a previous worst IR drop during the local optimization and ending the local optimization when the relative error is within a predetermined allowable error range.

The present invention, in the layout of an integrated circuit with multiple voltage domains, can provide optimized power/ground pads in consideration of the structure and size of each domain.

Furthermore, the conventional optimization method can be improved to reduce the optimization time and prevent inappropriate pad arrangement.

Moreover, worst IR drop sensitivity of pads in the power/ground distribution network can be checked after pad optimization to additionally exclude unnecessary pads.

In addition, optimized pads can be automatically allocated in floor plan to provide user convenience.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Hereinafter, the present invention will be described in detail by explaining preferred embodiments of the invention with reference to the attached drawings.

Figure 2:
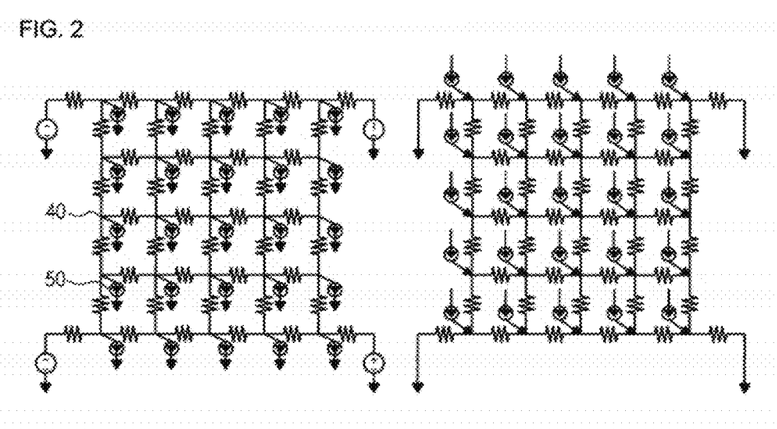
FIG. 2 illustrates modeling of a power distribution network of a chip.
Figure 3:
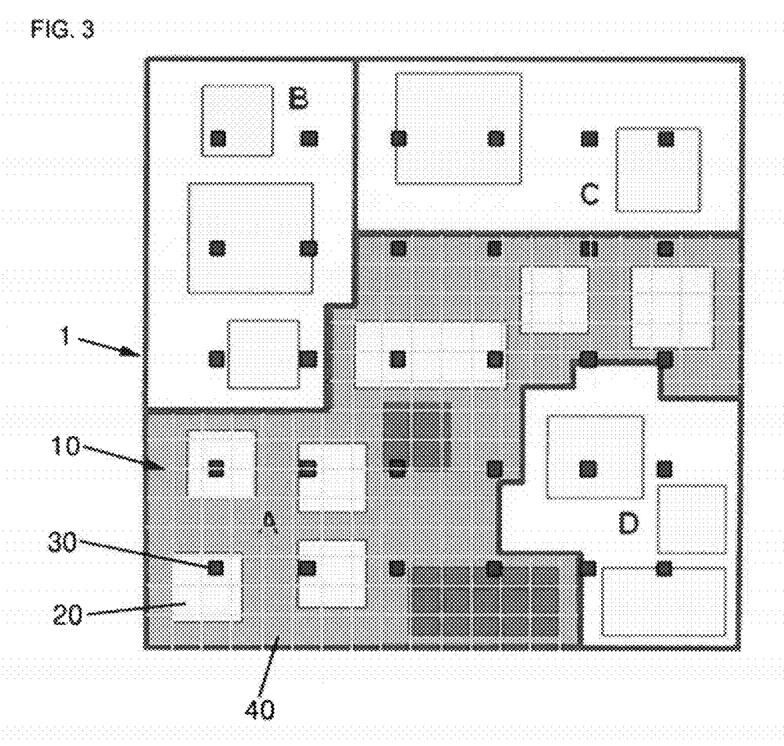
FIG. 3 illustrates multiple voltage domains, basic blocks and pads for explaining the present invention.

FIG. 2 illustrates modeling of a power/ground distribution network of a chip and FIG. 3 illustrates multiple voltage domains, basic blocks and pads for explaining the present invention.

Multiple functional blocks 20 of a chip 1 are classified by voltage domains 10 and pad optimization according to the present invention is performed for each voltage domain 10. FIG. 3 illustrates multiple voltage domains A, B, C and D and bump bonding pads as pads. Although the pad optimization is carried out for each voltage domain 10, the pad optimization is executed for the voltage domain A shown in FIG. 3 as an example in the description. The power/ground distribution network as shown in FIG. 2 is created for the voltage domain A. In the power/ground distribution network, a load current source 50 is applied to each node 40.

Figure 4:
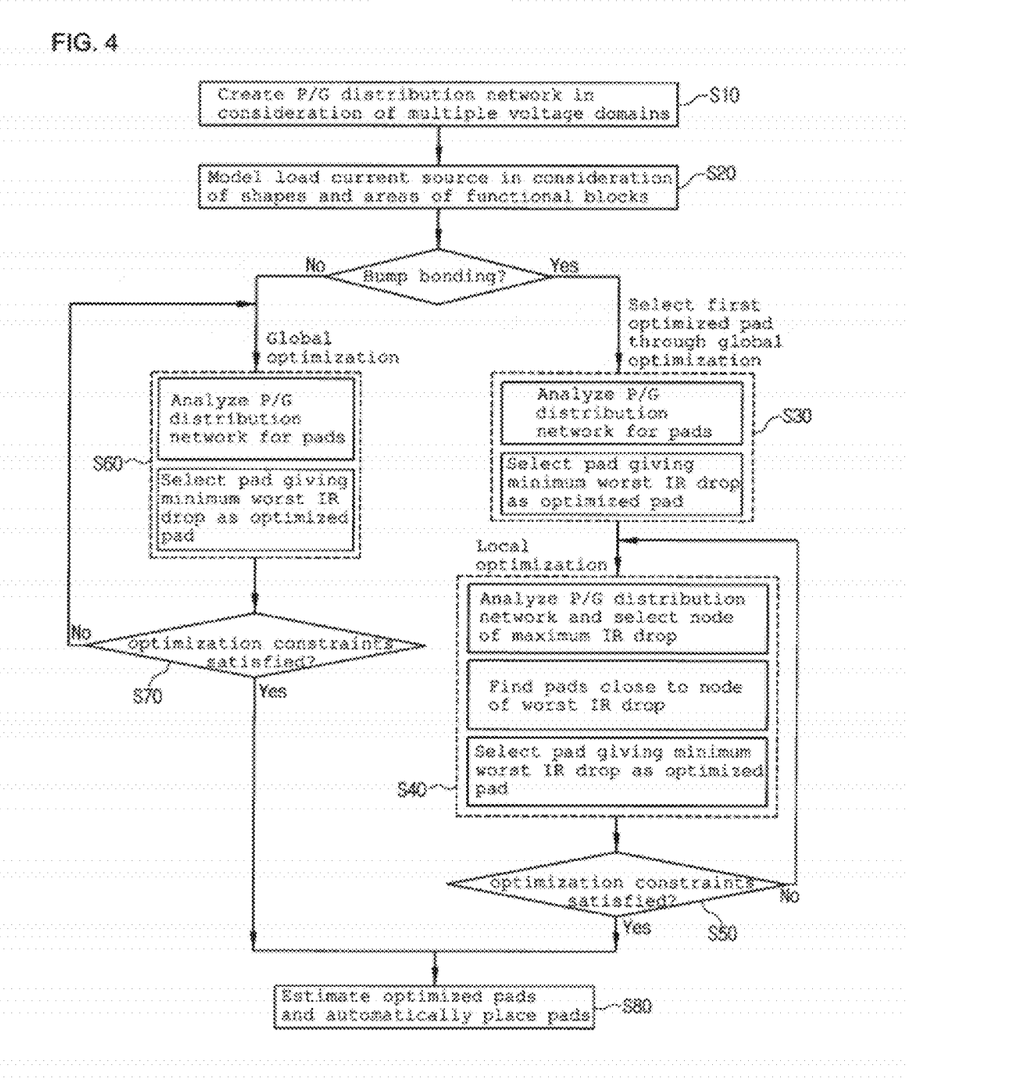
FIG. 4 is a flowchart of a method for optimizing the location and number of power/ground pads on a power/ground distribution network with multiple voltage domains according to the present invention.

FIG. 4 is a flowchart of a method for optimizing the location and number of power/ground pads on a power/ground distribution network with multiple voltage domains according to the present invention.

The optimization method includes a step S10 creating the power/ground distribution network for each voltage domain, a step S20 of modeling a load current source for each node of the power/ground distribution network, a step S30 of determining whether a chip pad bonding method is a bump bonding method, analyzing the power/ground distribution network for pads when the chip pad bonding method corresponds to the bump bonding method and selecting a pad giving a minimum worst IR drop as a first optimized pad, a local optimization step S40 of analyzing the power/ground distribution network according to optimized pads selected so far to select a node of maximum IR drop, finding pads close to the node of maximum IR drop and selecting a pad giving a minimum worst IR drop as an optimized pad, a step S50 of repeating the local optimization S40 until optimization constraints are satisfied, and a step S80 of automatically allocating optimized pads selected so far and storing corresponding information when the optimized pads satisfy the optimization constraints.

Furthermore, the optimization method includes a global optimization step S60 of analyzing the power/ground distribution network for the pads and selecting a pad having a minimum worst IR drop as an optimized pad when the chip pad bonding method does not correspond to the bump bonding method, and a step S70 of repeating the global optimization step S60 that analyzes the power/ground distribution network for optimized pads selected so far to select a pad having a minimum worst IR drop as an optimized pad until the optimization constraints are satisfied and proceeding to the step S80 when the optimization constraints are satisfied.

1. Step of creating a power/ground distribution network in consideration of multiple voltage domains (S10)

When an integrated circuit has multiple voltage domains, it is required to create a power/ground distribution network in consideration of the structure and size of the multiple voltage domains to secure optimized pads.

The present invention proposes a method of creating the power distribution/ground network in consideration of the multiple voltage domains.

In the first step, the voltage domains in a chip layout are analyzed and the power/ground distribution network is automatically created according to the size and structure of a designated voltage domain.

In the second step, functional blocks and pad candidates belonging to the designated voltage domain are selected.

FIG. 3 shows exemplary multiple voltage domains and selection of functional blocks and pad candidates in a designated voltage domain 'A'.

2. Step of modeling a load current source in consideration of actual shapes and areas of functional blocks (S20)

The load current source 50, an element of the vector of a current source in the equation 1, represents power consumption of the functional block 20 in the power/ground distribution network and is calculated based on the size and power consumption of the functional block 20. The worst IR drop is generated at the node 40 to which the load current source 50 belongs, and thus the node 40 having the load current source 50 is used as an IR drop observation node.

In a prior art, the arrangement of load current sources is simplified by equally spacing the load current sources in the functional block or placing them at the center of a function block. However, optimization is performed by maintaining a specific voltage level only for observation nodes, and thus it is very important to determine the location and number of the observation nodes in the power/ground distribution network.

Accordingly, the present invention provides a more accurate current calculating method.

Figure 5:
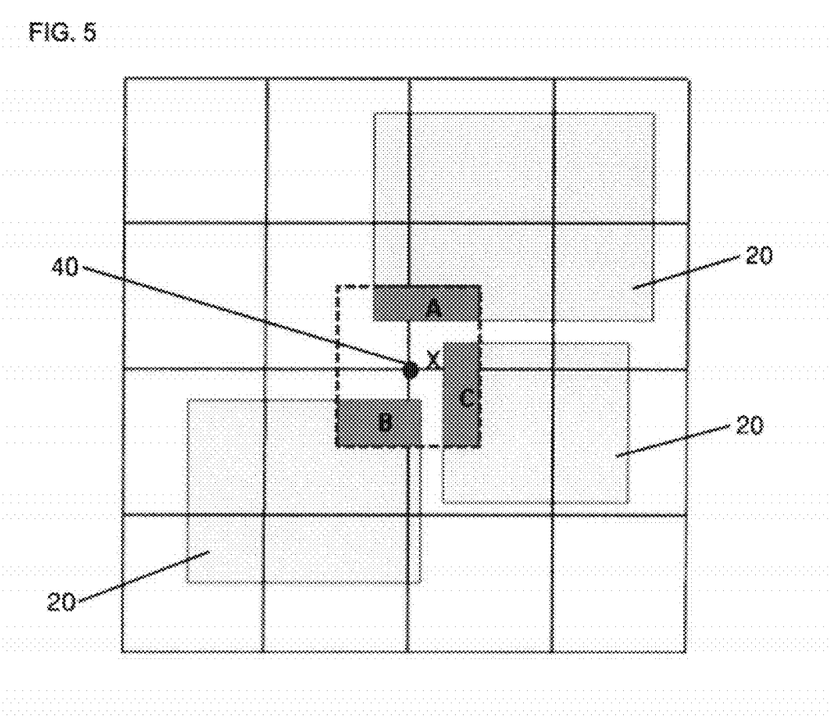
FIG. 5 illustrates load current source modeling according to the present invention.

FIG. 5 illustrates load current source modeling according to the present invention. Referring to FIG. 5, if functional blocks 20 are arranged in a square having an X node 40 at the center thereof in the power/ground distribution network, a load current source is connected to the node 40 and a current value is calculated based on the areas a, b and c of overlapped portions of the square and the functional blocks. 20.

This method can reflect the arrangement and sizes of functional blocks of the actual integrated circuit power/ground distribution network because the method uses actual power consumption of functional blocks arranged in a specific area including an arbitrary node as a load current source. Furthermore, the present invention can calculate not only a load current source of a functional block but also a load current source at a standard cell level. In addition, the present invention can also calculate a load current source of functional blocks arranged in a polygon, distinguished from a conventional method of calculating a load current source of functional blocks arranged in a square.

In FIG. 5, the load current source connected to the X node 40 is calculated based on the areas a, b and c of the overlapped portions of the square having the X node 40 at the center thereof and the functional blocks 20 around the square.

3. Global optimization (S30) and local optimization (S40) for remedying shortcomings of global optimization through local optimization and selecting optimized pads according to a combination of global optimization and local optimization A global optimization method that is a conventional optimization method reduces the worst IR drop of the entire power/ground distribution network rather than decreasing IR drop of a specific node, and thus optimized pads tend to be concentrated on the center of the power/ground distribution network and a large number of pads may be used to satisfy optimization constraints according to the arrangement and sizes of functional blocks.

Furthermore, the global optimization method analyzes the power/ground distribution network using all of given pad candidates and finds pads, and thus the optimization time is affected by the number of the given pad candidates. Accordingly, the global optimization method is not suitable for recent integrated circuit layouts using bump bonding that requires a large number of pads because the global optimization method takes a long time for optimization.

The present invention develops a local optimization method to solve the problem generated when the conventional global optimization method is applied to the integrated circuit layouts using bump bonding and applies a combination of global optimization and local optimization to the integrated circuit layouts using bump bonding based on the local optimization method to discriminate the bump bonding method from the wire bonding method.

The basic concept of the local optimization selects a pad candidate nearest to a node having the worst IR drop based on the free pad arrangement of the bump bonding method to reduce the worst IR drop. That is, although the global optimization selects an optimized pad using all of given pad candidates, the local optimization uses only pad candidates close to the node having the worst IR drop so as to reduce the optimization time. In addition, the local optimization allocates pads in proximity to a point where IR drop is actually generated, and thus accuracy is improved to reach a target worst IR drop using a small number of pads.

As shown in FIG. 4, the first pad is determined using the global optimization method in the first step. Although the number of pads, which is determined through the global optimization to minimize the optimization time, is restricted to one in the present invention, the number of pads can be changed according to the characteristic of integrated circuit layout. When the first pad is determined in the first step, the second and following pads are sequentially determined using the local optimization method in the second step.

The global optimization S30 is for the purpose of finding the worst IR drop of the power/ground distribution network in the initial stage and reducing the worst IR drop, and thus a target voltage value is not limited.

Figure 6:
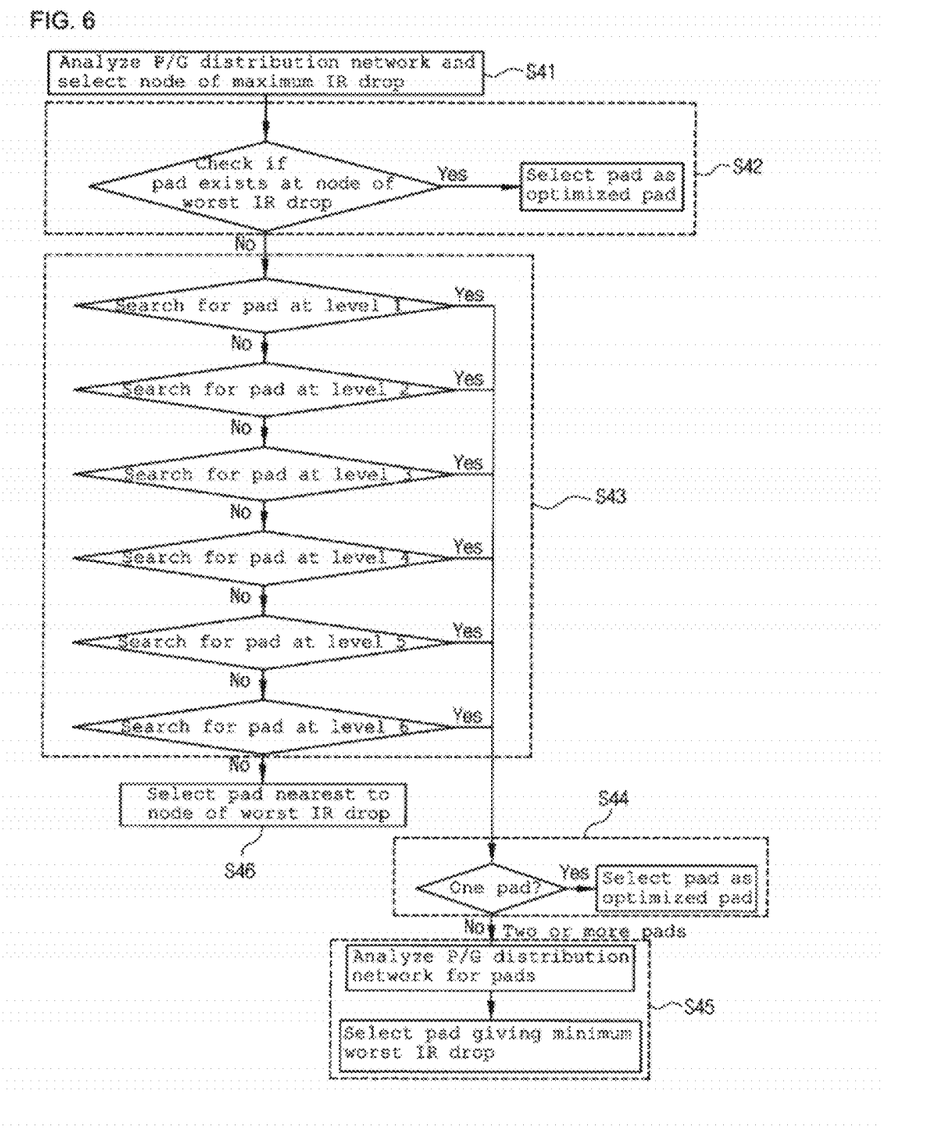
FIG. 6 is a flowchart of a local optimization method according to the present invention.

FIG. 6 is a flowchart of the local optimization method according to the present invention.

Referring to FIG. 6, the local optimization process S40 includes a first step S41 of analyzing the power/ground distribution network according to optimized pads selected so far and finding a node having the worst IR drop, a second step S42 of checking if a pad exists at the node having the worst IR drop and selecting the pad as an optimized pad when the pad exists at the node, a third step S43 of setting an area that connects neighboring nodes spaced apart from the node having the worst IR drop, found in the first step S41, by a single segment (a distance between nodes adjacent to each other) as a search area and searching for pad candidates while sequentially increasing the level of the search area until a pad candidate is searched in the search area or the level of the search area reaches a predetermined search level when the pad is not found in the second step S42, a fourth step S44 of determining a pad candidate as an optimized pad when the pad candidate is searched in the search area in the second step S42, a fifth step S45 of analyzing the power/ground distribution network using two or more pad candidates when the two or more pad candidates are searched in the search area in the third step S43 and determining a pad candidate having a minimum worst IR drop as an optimized pad, and a sixth step S46 of finding a pad candidate nearest to the node having the worst IR drop, found in the first step S41, and determining the found pad candidate as an optimized pad when any pad candidate is not searched even when pad candidates are searched until the level of the search area reaches the predetermined search level in the third step S43.

As shown in FIG. 6, the local optimization process begins finding a node having the worst IR drop in the power/ground distribution network. In the analysis of the power/ground distribution network, pads selected in a previous step must be included. When the node having the worst IR drop is determined, pad candidates nearest to the node having the worst IR drop are searched. The number of pad candidates may be one or more according to the arrangement of nodes and pad candidates.

Figure 7:
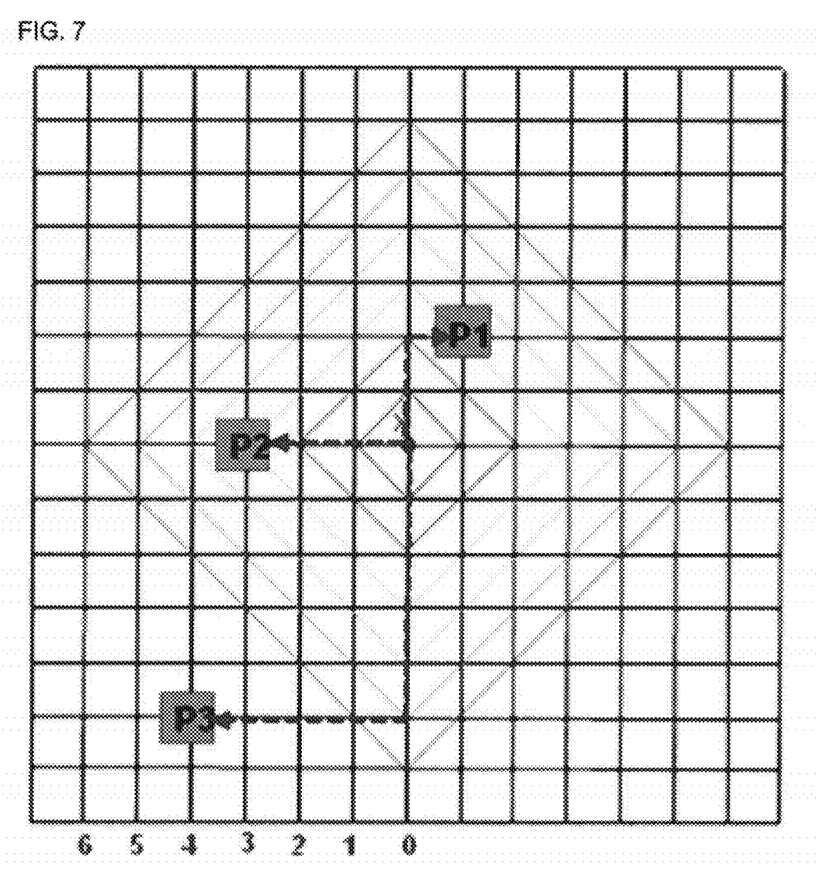
FIG. 7 is a diagram for explaining a method of searching for a pad nearest to a node having the worst IR drop in local optimization according to the present invention.

FIG. 7 is a view for explaining a method of searching for a pad candidate nearest to the node having the worst IR drop in the local optimization process according to the present invention.

Pad candidates are searched using the node having the worst IR drop as a starting point (level 0). If any pad candidate is not discovered, neighboring nodes in a diamond-shaped area having the node with the worst IR drop at the center are searched to find pad candidates (level 1). If a pad candidate is discovered in the first step (level 0), the pad candidate is selected as an optimized pad and stored in a pad list.

If a pad candidate is discovered in the second step, the pad candidate is determined as a pad. If two or more pad candidates are discovered, the power/ground distribution network is analyzed using the two or more pad candidates to determine a pad candidate giving a minimum worst IR drop as a pad.

If any pad candidate is not discovered even in the second step, the diamond-shaped area is magnified and pad candidates are found (level 2) and analysis and selection using pad candidates are repeated.

This operation is repeated and finally performed for a node spaced apart from the node having the worst IR drop by six segments (level 6). If any pad candidate is not found after the level-6 step, a pad candidate nearest to the node having the worst IR drop is found and determined as a pad.

This search method is applicable to layouts having doughnut and stag style bump pad arrays as well as layouts having a uniform bump pitch.

In FIG. 7, pad candidates P1 and P2 are found at level 2 and a pad candidate giving a minimum worst IR drop, is determined after the analysis of the power/ground distribution network. If any pad candidate is not found until level-6 step, a pad candidate P3 nearest to the node having the worst IR drop beyond the diamond-shaped area is found.

4. Optimization estimation step improved by adding convergence condition to optimization constraints (S50)

Conventional optimization constraints are direct and simple, and thus the constraints can be easily applied. However, when the conventional optimization constraints are applied to an actual optimization work, the constraints cannot be satisfied according to the characteristic and structure of the power/ground distribution network or an unnecessarily large number of pads are used to increase the optimization time even if the constraints are satisfied. To solve this problem, the present invention proposes addition of a convergence condition during the pad optimization process. That is, an error in the worst IR drop, calculated with pads currently and previously selected, is calculated according to the following equation and compared with a designated convergence condition error to determine whether to perform optimization.

[Equation 2]

$$\text{Relative error} = \{(\text{current worst IR drop} - \text{previous worst IR drop})/(\text{previous worst IR drop})\} \times 100$$

This method can stop optimization when the worst IR drop does not reach a target value and the relative error is small, that is, when the worst IR drop of the power/ground distribution network is not decreased any more even when additional pads are allocated, to thereby reduce an unnecessary time taken for optimization.

5. Method of estimating pad optimization and automatically allocating optimized pads The number of available pad/ground pads is limited in the actual layout of a power/ground distribution network of an integrated circuit, and thus the number of optimized pads exceeds a target limit value in many cases. In this case, it is required to exclude pads having low sensitivity to satisfy the target limit value.

The present invention provides a graph showing the worst IR drop of the power/ground distribution network according to the location and number of optimized pads in the power/ground distribution network with a designated voltage domain and a variation in the number of pads so as to help user estimate pads having low sensitivity and additionally exclude the pads.

Figure 8:
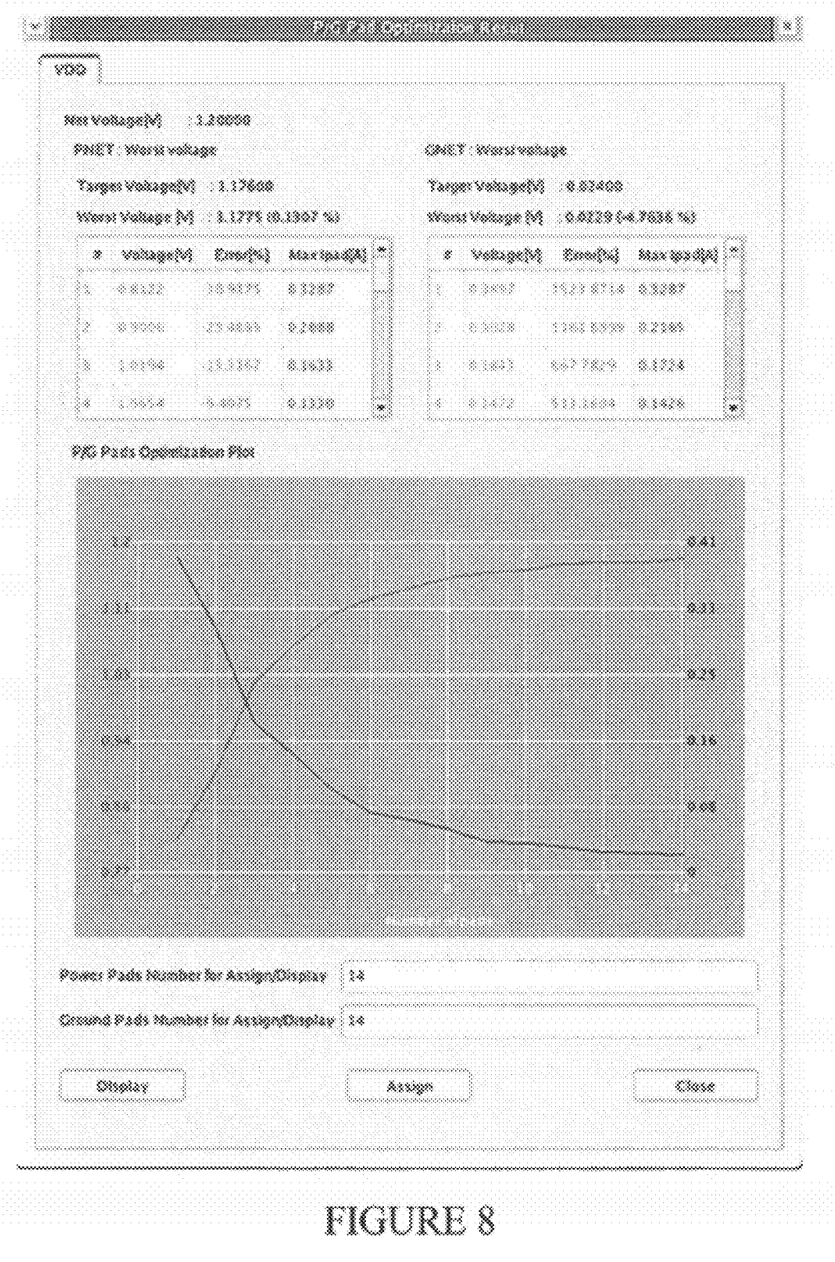
FIG. 8 is a graph showing the worst IR drop of a power/ground distribution network according to a variation in the number of pads according to the present invention.

FIG. 8 illustrates an exemplary graph showing the worst IR drop of the power/ground distribution network according to a variation in the number of pads according to the present invention.

Referring to FIG. 8, it can be observed that the worst IR drop curve steeply increase up to previously selected pads and then is saturated having a low slope. This means that sensitivity of the number of pads decreases as the slope of the graph decreases.

After optimized pads are selected through the optimization process, the graph as shown in FIG. 8 is displayed on a screen such that the user can additionally exclude pads having low sensitivity from the selected optimized pads while watching the displayed graph.

Figure 9:
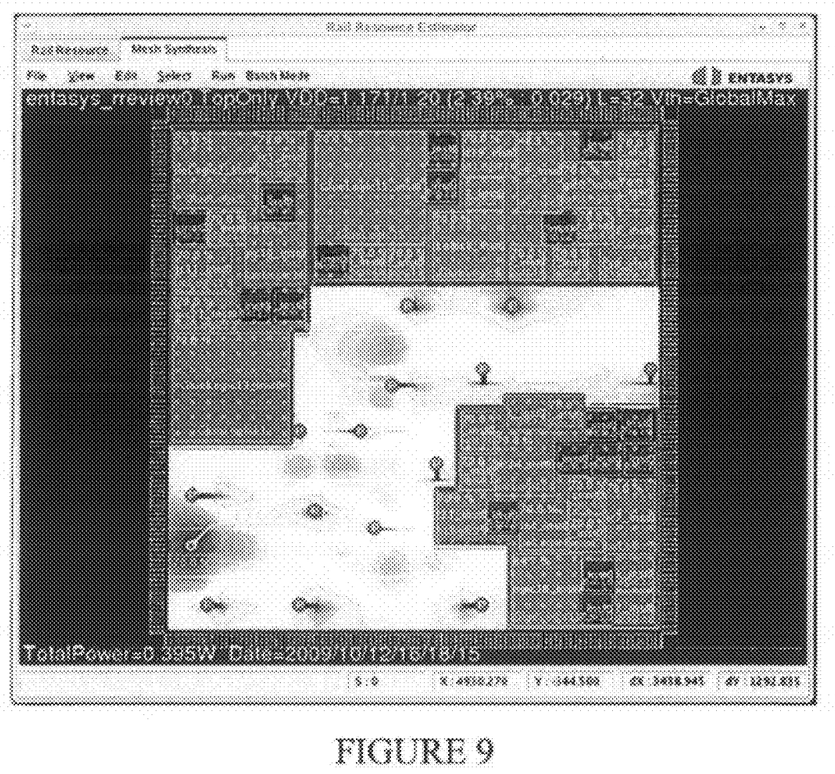
FIG. 9 illustrates a result obtained by automatically allocating optimized power pads in an integrated circuit layout and estimating the optimized power pads according to the present invention.

FIG. 9 illustrates a result obtained by automatically allocating optimized power pads in an integrated circuit layout and estimating the power pads according to the present invention. As shown in FIG. 9, the optimization result is displayed on a layout screen to complete optimized pad selection and the location and number of optimized pads are automatically set.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A method for optimizing locations and a number of power/ground pads on a power/ground distribution network with multiple voltage domains in a layout of an integrated circuit using bump bonding, the method comprising:
    a first optimized pad selecting step, which is performed by a computer, of analyzing, the power/ground distribution network for each pad using a global optimization method to find nodes having a worst IR drop for each pad respectively, and selecting a pad corresponding to a node having a minimum worst IR drop among nodes having the worst IR drop as a first optimized pad;
    a second optimized pad selecting step, which is performed by the computer, of finding a second optimized pad nearest to the node having the worst IR drop found from an analysis of the power/ground distribution network with the first optimized pad;
    a local optimization step, which is performed by the computer, of analyzing the power/ground distribution network by simultaneously applying optimized pads selected so far to the power/ground distribution network to find a node having the worst IR drop, finding a pad nearest to the node having the worst IR drop and selecting the pad as an optimized pad;
    an optimization constraints determination step, which is performed by the computer, of ending the local optimization step if a maximum IR drop value of the first optimized pad selected in the first optimized pad selecting step, the second optimized pad selected in the second optimized pad selecting step or the optimized pad selected in the local optimization step is smaller than a predetermined reference value or a maximum current value of the first optimized pad selected in the first optimized pad selecting step, the second optimized pad selected in the second optimized pad selecting step or the optimized pad selected in the local optimization step is smaller than another predetermined reference value and
    an optimization completing step, which is performed by the computer, of repeating the local optimization step until optimization constraints are satisfied in the optimization constraints determination step, storing information about selected optimized pads when the optimization constraints are satisfied and ending the local optimization step.

2. The method of claim 1, wherein the optimization constraints determination step comprises an optimization convergence step of calculating a relative error of a current worst IR drop and a previous worst IR drop during the local optimization step and ending the local optimization step when the relative error is within a predetermined allowable error range.

3. The method of claim 2, wherein the optimization convergence step is performed only when a number of optimized pads exceeds a predetermined minimum number of optimized pads.

4. A method for optimizing locations and a number of power/ground pads on a power/ground distribution network with multiple voltage domains, the method comprising:
    a step S10, which is performed by a computer, of designing the power/ground distribution network for each of the multiple voltage domains;
    a step S20, which is performed by the computer, of modeling a load current source for each node of the power/ground. distribution network;
    a step S30, which is performed by the computer, of checking if a pad bonding method of a chip is a bump bonding method, analyzing the power/ground. distribution network for each pad to find nodes having a worst IR drop for each pad respectively when the pad bonding method corresponds to the bump bonding method, and selecting a pad corresponding to a node having a minimum worst IR drop among nodes having the worst IR drop as a first optimized pad;
    a step S40, which is performed by the computer, of selecting a node having the worst IR drop by analyzing the power/ground distribution network according to optimized pads selected so far, and selecting a pad that is a minimum worst ER drop as an optimized pad by searching for pads close to the selected node; and
    a step S50,which is performed by the computer, of repeating the step S40 until optimization constraints are satisfied and storing information about corresponding optimized pads when the optimization constraints are satisfied.

5. The method of claim 4, further comprising a step S80, which is performed by the computer, of estimating optimized pads, additionally excluding an optimized pad and setting the remaining optimized pads as final optimized pads when the optimization constraints are satisfied in the step S50, wherein the step S80 comprises:
    a first step of creating a graph showing the worst IR drop of the power/ground distribution network according to a variation in a number of selected optimized pads when the optimization constraints are satisfied in the step S50;
    a second step of displaying the created graph and information on locations and a number of optimized pads in the power/ground distribution network on a screen;
    a third step of estimating a pad with low sensitivity by a user based on the information provided in the second step and setting current optimized pads as final optimized pads or, when at least one pad is selected to be additionally excluded, deleting an optimized pad corresponding to the at least one pad selected; and
    a fourth step of storing the locations and the number of the optimized pads determined in the third step and ending the estimating.

6. The method of claim 4, further comprising a step S60, which is performed by the computer, of selecting the power/ground distribution network for each pad and selecting a pad that is a minimum worst IR drop as an optimized pad and a step 570, which is performed by the computer, of repeating the step S60 until the optimization constraints are satisfied to select a plurality of optimized pads when the pad bonding method corresponds to a wire bonding method.

7. The method of claim 4, wherein the step S10 comprises the steps of
    analyzing multiple voltage domains in a layout of a chip with the multiple voltage domains and automatically creating the power/ground distribution network according to a size and a structure of a designated voltage domain; and selecting functional blocks and pad candidates belonging to the designated voltage domain.

8. The method of claim 4, wherein the step S20 comprises steps of:
- setting nodes of the power/ground distribution network as observation nodes, virtually segmenting an area corresponding to the observation nodes such that neighboring observation nodes are not overlapped and regions of the observation nodes have the same area, and calculating areas of functional blocks belonging to the region of a corresponding observation node; and
- calculating a load current source based on a sum of the calculated areas of the functional blocks and setting the calculated load current source as a load current source of the corresponding observation node.

9. The method of claim 4, wherein the step S40 comprises:
- a step S41 of analyzing the power/ground distribution network according to optimized pads selected so far and finding a node having the worst IR drop;
- a step S42 of checking if a pad exist at the node having the worst IR drop and selecting the pad as an optimized pad when the pad exists at the node having the worst IR drop;
- a step S43 of setting an area that connects nodes spaced apart from the node having the worst IR drop, found in the step S41, by a single segment, which is a distance between two adjacent nodes, as a search area and searching for pad candidates while sequentially increasing a level of the search area until a pad candidate is found in the search area or the level of the search area reaches a predetermined search level when any pad is not found in the step S42;
- a step S44 of determining a pad candidate as an optimized pad when the pad candidate is found in the search area;
- a step S45 of analyzing the power/ground distribution network using two or more pad candidates when the two or more pad candidates are found in the search area in the step S43 and determining a pad candidate having a minimum worst IR drop as an optimized pad; and
- a step S46 of determining a pad nearest to the node having the worst IR drop, found in the step S41, as an optimized pad when no pad is found even when pad candidates are searched until the level of the search area reaches the predetermined search level in the step S43.

10. The method of claim 4, wherein the step S50 comprises:
- an optimization constraints determination step of determining that the optimization constraints are satisfied when IR drops of nodes of the power/ground distribution network for optimized pads selected so far and current flowing through pads are within an allowable range set on a layout and ending a local optimization; and
- an optimization convergence step of calculating a relative error of a current worst IR drop and a previous worst IR drop during the local optimization and ending the local optimization when the relative error is within a predetermined allowable error range.

11. The method of claim 10, wherein the optimization convergence step is performed after a number of optimized pads selected so far exceeds a predetermined minimum number of optimized pads.

* * * * *